US012144766B2

(12) United States Patent
Davis

(10) Patent No.: US 12,144,766 B2
(45) Date of Patent: Nov. 19, 2024

(54) LIGHTWEIGHT URN WITH MEMENTO DISPLAY

(71) Applicant: VANDOR GROUP, INC., Richmond, IN (US)

(72) Inventor: Justin F. Davis, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 54 days.

(21) Appl. No.: 17/989,570

(22) Filed: Nov. 17, 2022

(65) Prior Publication Data

US 2023/0149242 A1 May 18, 2023

Related U.S. Application Data

(60) Provisional application No. 63/280,522, filed on Nov. 17, 2021.

(51) Int. Cl.
*A61G 17/08* (2006.01)
*A61G 17/007* (2006.01)

(52) U.S. Cl.
CPC ......... *A61G 17/08* (2013.01); *A61G 17/0073* (2013.01)

(58) Field of Classification Search
CPC ................ A61G 17/08; A61G 17/0073; A61G 17/0136; E04H 13/008; B65D 5/4237; B65D 5/4233; B65D 5/18; B65D 5/2052; B65D 5/2057; B65D 25/54; B65D 25/4204; G09F 2023/0025; G09F 23/00
See application file for complete search history.

(56) References Cited

U.S. PATENT DOCUMENTS 3,112,058 A * 11/1963 Martin ..................... B65D 5/22 229/122
5,823,352 A * 10/1998 Mena ................... B65D 5/4204 206/721
6,574,840 B1 * 6/2003 Doppel .................. A61G 17/06 27/19
7,533,774 B2 * 5/2009 Zimmerman .......... B65D 5/665 206/387.14
11,505,363 B1 * 11/2022 Chadwick ................ B65D 5/66
11,613,400 B1 * 3/2023 Hogan ................. B65D 5/6661 229/208
2003/0080016 A1 * 5/2003 Lipper .................... G09F 23/00 206/459.5
2003/0203138 A1 * 10/2003 Gargus ..................... B41M 3/00 428/203

(Continued)

*Primary Examiner* — William L Miller

(74) *Attorney, Agent, or Firm* — Maginot, Moore & Beck LLP

(57) ABSTRACT

An urn is configured to receive cremation remains includes a folded corrugated fiberboard box. The folded corrugated fiberboard box has a bottom, a front panel, a rear panel, and first and second sides, and a lid configured to extend over a top opening and over the front panel in a closed position. The lid has a first flap inserted between the front panel and the first side in the closed position. The lid includes a window defined therethrough, and a transparent window cover, The front panel includes adhesive disposed adjacent to or aligned with the window, the adhesive configured to support a paper substrate having at least one image such that, when the lid is in the closed position, at least a portion of the at least one image is visible through the window.

17 Claims, 4 Drawing Sheets

(56) References Cited

U.S. PATENT DOCUMENTS

| | | | | |
|---|---|---|---|---|
| 2009/0020444 A1* | 1/2009 | Green | B65D 85/187 | 493/320 |
| 2010/0314268 A1* | 12/2010 | Goodman | B65D 5/721 | 206/281 |
| 2012/0180275 A1* | 7/2012 | Kocir | A61G 17/0106 | 27/1 |
| 2023/0249869 A1* | 8/2023 | Ball | B65D 5/301 | 206/299 |
| 2023/0271745 A1* | 8/2023 | Tanna | B65D 5/4233 | 493/37 |

* cited by examiner

LIGHTWEIGHT URN WITH MEMENTO DISPLAY

This application claims the benefit of U.S. Provisional Patent Application Ser. No. 63/280,522, filed Nov. 17, 2021, the disclosure of which is incorporated herein by reference in its entirety.

FIELD OF THE INVENTION

The present invention relates to urns for cremated remains of humans and pets.

BACKGROUND

Humans, as well as animal pets such as dogs and cats are often cremated after death. In many cases, the family or pet owner retains the cremated remains for sentimental purposes. Urns for humans and pets vary in design from elaborate to simple wooden boxes. It can be advantageous to personalize the urn design with an imprinted name, and/or photograph of the deceased. In current designs, a wood or wood-composite container or box is outfitted with one or more photograph holders, or plaque holders.

One disadvantage of such designs is the cost, which is due to the cost of manufacture and materials. There is a need, therefore, for a personalizable and decorative urn design that has reduced cost, but still maintains durability and ease of use.

SUMMARY

The embodiments described herein address the above-described need, as well as others, by providing a foldable corrugated fiberboard urn that has a photograph mounting and protection arrangement. The corrugated fiberboard can facilitate the use of decorative designs by relatively straightforward printing processes.

A first embodiment is an urn configured to receive cremation remains that includes a folded corrugated fiberboard box. The folded corrugated fiberboard box has a bottom, a front panel, a rear panel, and first and second sides, and a lid configured to extend over a top opening and over the front panel in a closed position. The lid has a first flap inserted between the front panel and the first side in the closed position. The lid includes a window defined therethrough, and a transparent window cover, The front panel includes adhesive disposed adjacent to or aligned with the window, the adhesive configured to support a paper substrate having at least one image such that, when the lid is in the closed position, at least a portion of the at least one image is visible through the window.

In at least one embodiment, the front panel includes alignment markings defining an alignment position of the paper substrate. The alignment position corresponds to a mounting position of the paper substrate such that when the lid is in the closed position, the portion of the at least one image is visible through the window.

The above-described features and advantages, as well as others, will become more readily apparent to those of ordinary skill in the art by reference to the following detailed description and accompanying drawings.

DETAILED DESCRIPTION

Figure 1:
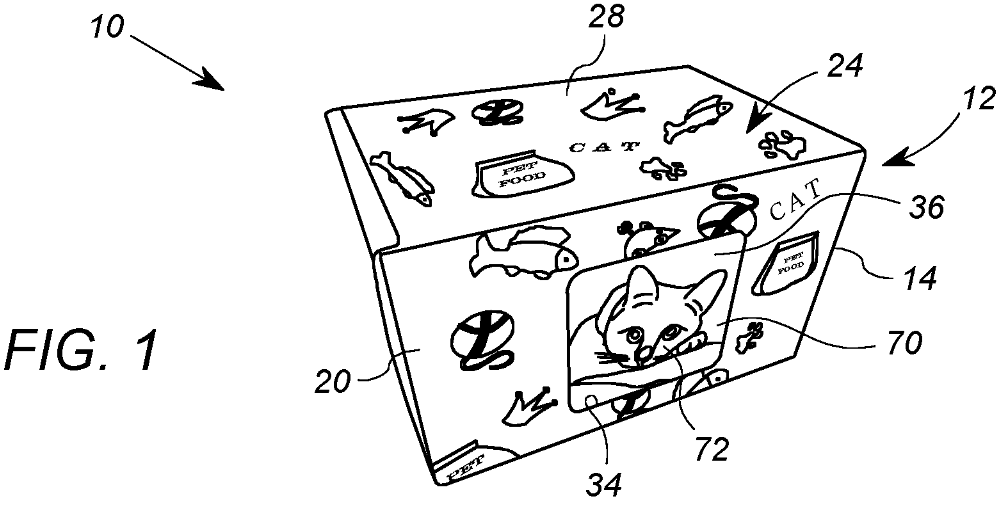
FIG. 1 shows a perspective view of a container according to a first embodiment, wherein a lid of the container is in a closed position.
Figure 2:
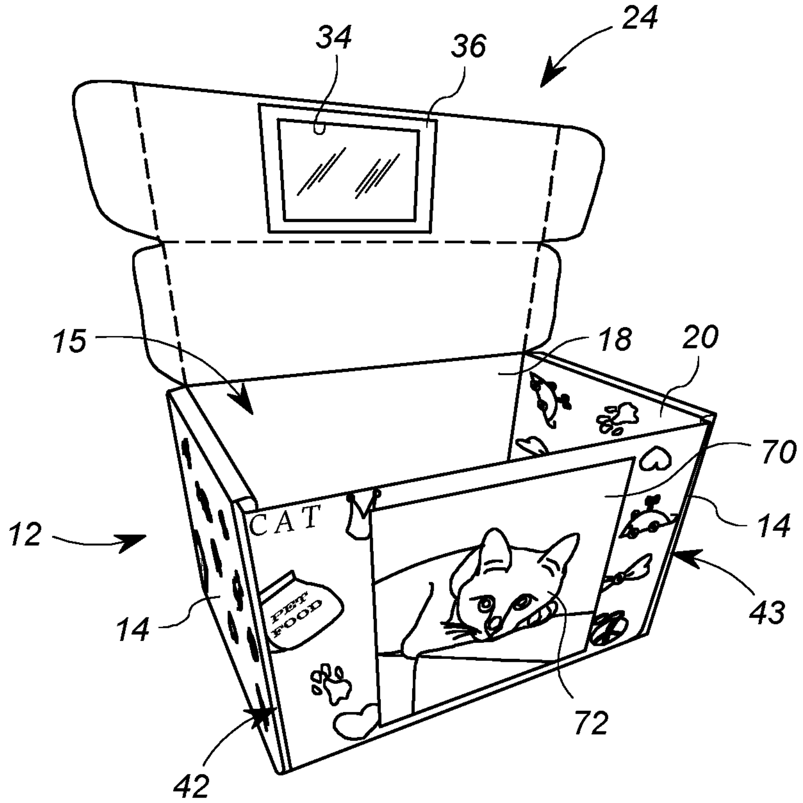
FIG. 2 shows a perspective view of the container of FIG. 1, wherein a lid of the container is in an open position.

FIG. 1 shows a perspective view of a container 10 according to a first exemplary embodiment in a closed state, and FIG. 2 shows a perspective view of the container 10 in the open state. In general, the container 10 include a box 12 having a bottom (not shown in FIG. 1, but see bottom 22 in FIGS. 4, 5 and 7), a front panel (or side) 14, a rear panel (or side) 18, a first side 16, a second side 20, and a lid 24. The front panel 14, rear panel 18, first side 16, second side 20 and bottom 22 form the box 12 and define a top opening 15. The lid 24 is foldably coupled to the rear panel 18, and is configured to extend over the top opening 15 and over the front panel 14 in a closed position, as shown in FIG. 1.

The front side 14 includes a photograph mounting arrangement 26, discussed further below in connection with FIG. 3. The box 12 and lid 24 are formed of corrugated fiberboard, such as E-flute corrugated fiberboard. Other types of corrugated fiberboard may be used.

Figure 3:
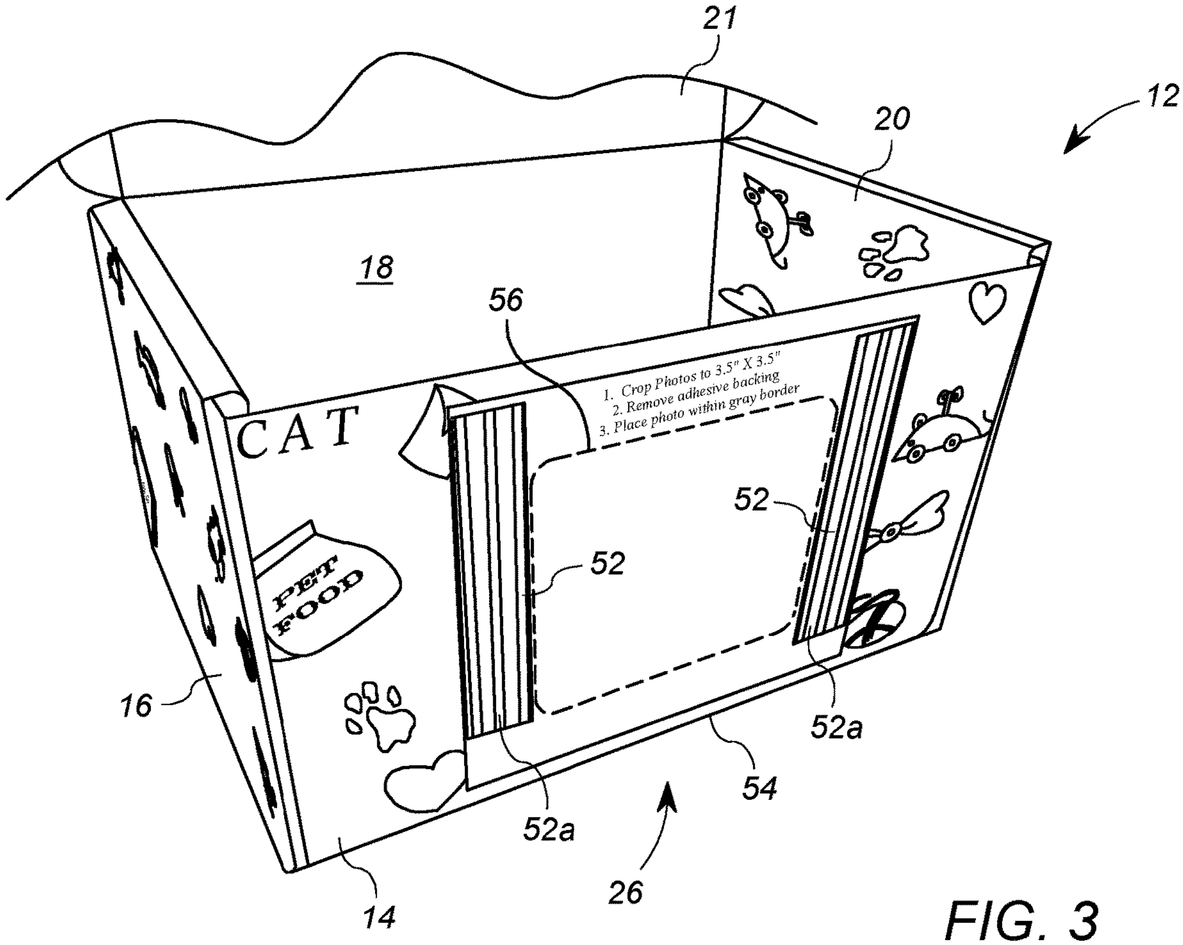
FIG. 3 shows a fragmentary perspective view of a box of the container of FIG. 1.
Figure 4:
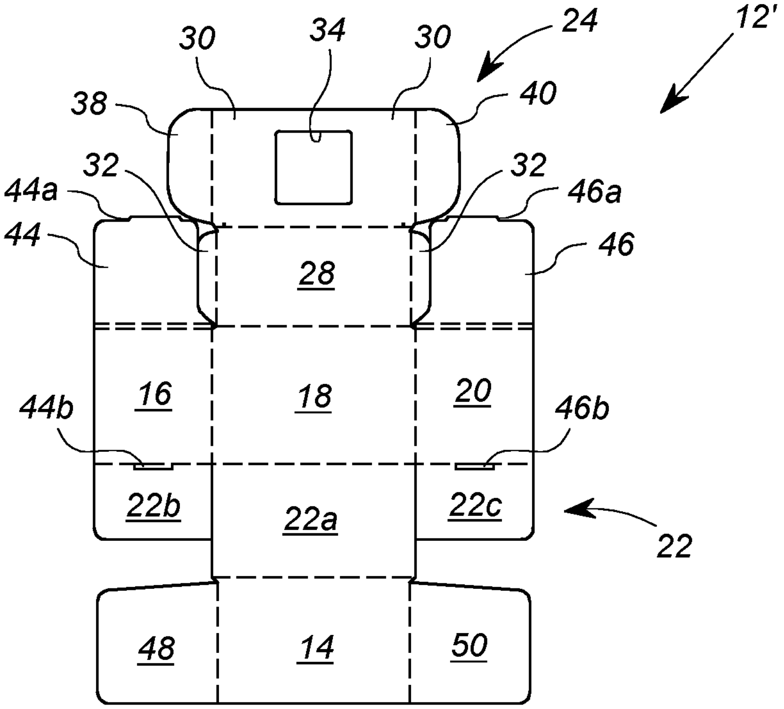
FIG. 4 shows a top plan view of a corrugated fiberboard blank that can be folded to form the box of the container of FIG. 1.
Figure 5:
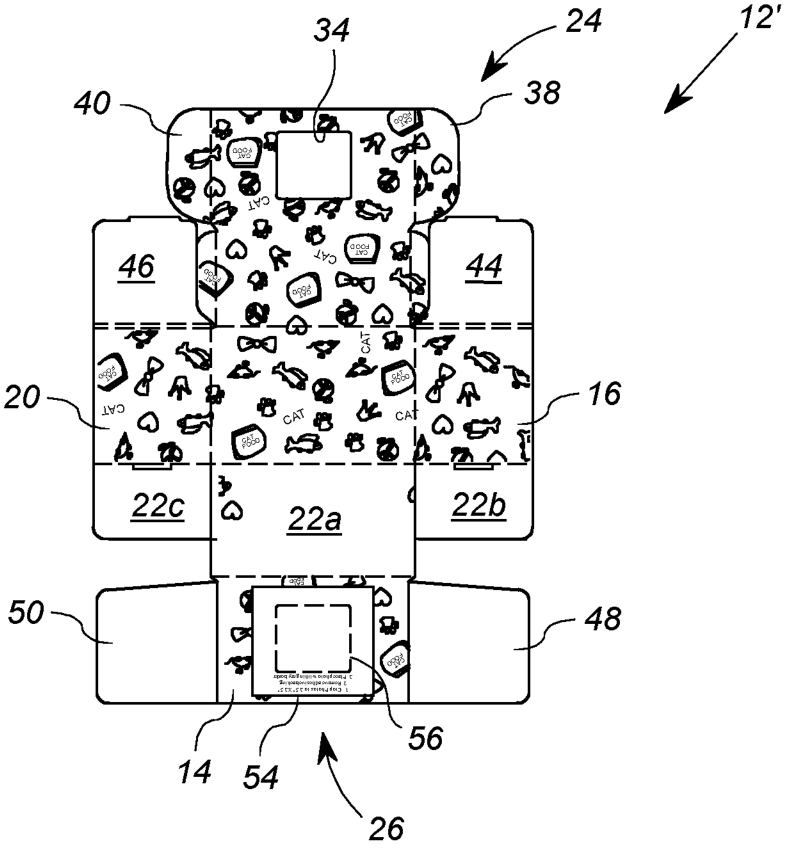
FIG. 5 shows a bottom view of the unfolded blank of FIG. 4.

FIG. 4 shows a top view of a corrugated fiberboard blank 12' that can be folded to form the box 12 of FIGS. 1 and 2, and thus constitutes the box 12 in an unfolded state. FIG. 5 shows a bottom view of the unfolded blank 12'. Like structures of box 12 of FIGS. 1 and 2 and the unfolded blank 12' of FIGS. 3 and 4 have the same reference numbers.

With references to FIGS. 1, 2, 4, and 5, the lid 24 includes a top panel 28 foldably connected at one edge to the back panel 18, and a front panel 30 foldably connected to the opposite edge of the top panel 28. The fold line between the top panel 28 and the back panel 18 is parallel to the fold line between front panel 30 and the top panel 28. The lid 24 further includes side tabs 32 foldably attached to and extending from lateral sides of the top panel 28, and wings 38, 40 foldably attached to and extending from lateral sides of the front panel.

The top panel 28 is configured to cover the top opening 15 of the open top box 12 in the closed position. The front panel 30 is configured to fold down over, at least in part, the front panel 14, as shown in FIG. 1. As shown in FIG. 2, among other places, the side wings 38 and 40 of the front panel 30 are configured to fit in respective openings 42, 43 between the front side 14 and lateral sides 16 and 20 of the box 12 in the closed position. The front panel 30 also includes a window opening or window 34 that is aligned with the photograph mounting arrangement 26 (in the closed position) such that some or all of the photograph mounting arrangement 26 is visible through the window opening 34. In this embodiment, a piece of transparent plastic sheeting 36 is attached to the underside of the front panel 30 and covers the window opening 34.

The photograph mounting arrangement 26 is configured to support a paper substrate with at least one image, such as a photograph or other decorative flat media, such that a front side of the media (i.e. the picture in the photograph) is visible and faces away from the front side 14. As shown in FIG. 1, when the top panel 28 covers the open top of the box 12 and the front panel 30 is folded down over the front side 14 in the closed position, the front side of the media is visible through the transparent plastic 36 and window 34.

FIG. 3 shows a fragmentary perspective view of the box 12 that is enlarged to show further detail regarding the mounting arrangement 26. The photograph mounting arrangement 26 includes adhesive affixed to the front panel 16 and disposed adjacent to or aligned with the window 34. With reference to both FIGS. 1 and 3, the adhesive is configured to support a paper substrate 70 having at least one image 72 such that, when the lid 24 is in the closed position, at least a portion of the image 72 is visible through the window 34. In the example, the image 72 is of a pet cat, and the substrate 70 is a photograph, or in other words, paper or a paper-like product on which the image 72 is printed.

The adhesive in this embodiment is the adhesive portions of two strips of double-sided tape 52. The double-sided tape 52 is attached to the outer surface of the front side 14, and is preferably shipped with one side still covered and unused by a peelable wax paper cover 52*a*. includes two pieces of double-sided tape 52

The photograph mounting arrangement 26 further includes alignment markings 54, 56 on the front panel 16. The alignment markings 54, 56 define an alignment position of the paper substrate 70. The alignment position corresponds to a mounting position of the paper substrate 70 such that when the lid 24 is in the closed position as shown in FIG. 1, at least a portion of the image 72 is visible through the window 34. In this embodiment, the alignment markings include substrate template indicia 54, image template indicia 56, and instructions indicia 58.

The substrate template indicia 54 includes line markings that indicate the size of the and position of the substrate or photograph to mount. The image template indicia 56 includes line markings that indicate the size and location of the image that will be visible through the window 34 when the lid 24 is in the closed position. It will be appreciated that the line markings 54, 56 need not be printed lines, but may also take the form of a linear border between two different color shades of printed matter, or any other combination of elements that provide a linear indication.

As discussed above, FIG. 4 shows a blank 12' of the box container 10, which may be die cut from a single sheet of corrugated fiberboard, and FIG. 5 shows the opposite side of the blank 12'. As shown in FIG. 4, the because the blank 12' is formed of corrugated fiberboard (and in this case a bleached white wall), the container 10 (or portions thereof) may readily be printed with decorative designs/indicia, providing another feature to improve the aesthetic quality of the urn container 10 at reduced cost. In FIGS. 4 and 5, folds between panels of the blank 100 are shown as broken lines, and cuts are shown as solid lines. In the blank the folds are formed by scoring for folding using any suitable method as is known in the art, and the cuts are formed entirely through blank 100.

With reference to FIGS. 4 and 5, the bottom 22 includes a bottom panel 22*a*, a bottom flap 22*b* foldably attached to the side 16, and a bottom flap 22*c* foldably attached to the side 20. The side panel 16 is also foldably attached to the bottom panel 22*a*, and on an opposite edge to a foldover flap 44. Similarly, the side panel 20 is also foldably attached to the bottom panel 22*a*, and on an opposite edge to a foldover flap 46. In general, the front panel 14 is foldably connected to one edge of the bottom panel 22*a*, and the other edge of the bottom panel is connected to one edge of the back panel 18. The opposite edge of the back panel 18 is connected to one edge of the top panel 28 of the lid 24. The opposite edge of the top panel 28 is connected to the front panel 30 of the lid 24.

The printed design in this embodiment is only printed on select visible portions of the exterior, as shown in FIGS. 4 and 5. However, it will be appreciated that more or less indicia may be used in more or fewer areas, as desired. It will also be appreciated that the indicia my use any suitable printed design, or even texturing. Limiting the printed design to select visible portions also reduces material costs and production costs.

Figure 6:
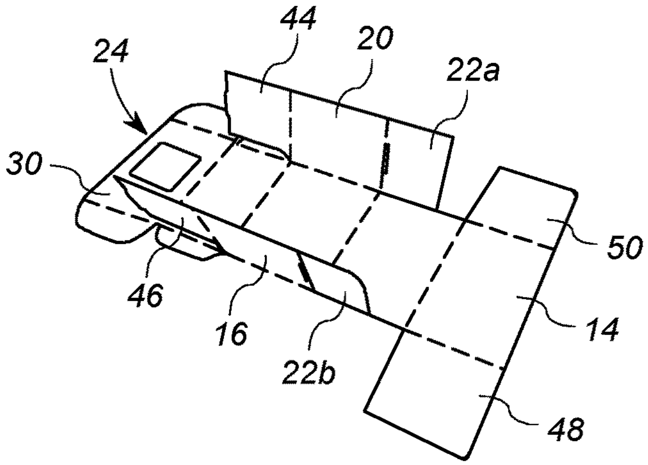
FIG. 6 shows a perspective view of the box of the container of FIG. 1 in a first partially foldably assembled state.
Figure 7:
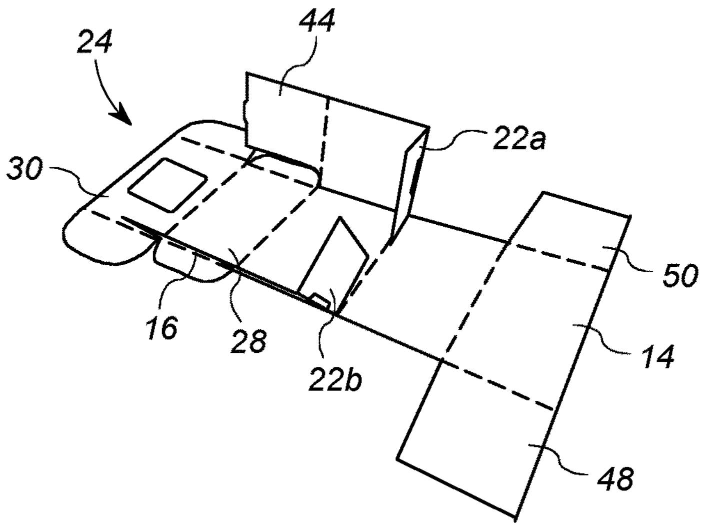
FIG. 7 shows a perspective view of the box of the container of FIG. 1 in a second partially foldably assembled state.

FIG. 6 shows a first step in foldably assembling the container 10. Firstly, the sides 16, 20 are folded up from a starting position shown in FIG. 4. The flaps 22*b* and 44 fold upward with the side 16, and the flaps 22*c* and 46 fold upward with the side 20. Thereafter, as shown in FIG. 7, the bottom flaps 22*b*, 22*c* are folded inward toward each other along their fold lines with respect to the sides 16, 20.

Figure 8:
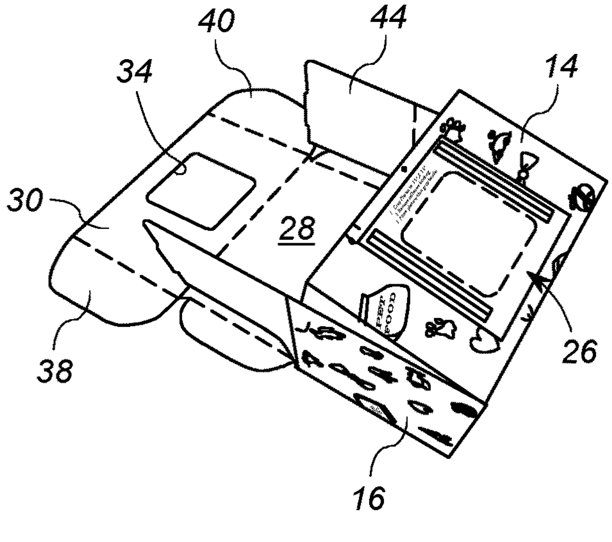
FIG. 8 shows a perspective view of the box of the container of FIG. 1 in a third partially foldably assembled state.

Thereafter, the bottom panel 22*a* is folded up to abut the surfaces of the flaps 22*b*, 22*c*, and may be secured thereto by double-sided tape, adhesive, or the like. Collectively, the bottom panel 22*a* and the flaps 22*b*, 22*c* form the bottom 22 of the box 12. The flaps 48, 50 are folded inward from the front panel 14, and the front panel 14 and folded flaps 48, 50 are folded upward toward side panels 16, 20. The folded flaps 48, 50 are disposed inward and adjacent to the inner surface of the respective side panels 16, 20, and thus between the front panel 14 and the side panels 16, 20. The resulting structure is shown in FIG. 8.

Thereafter, the flaps 44, 46 are folded downward over the flaps 48, 50. After folding the flaps 48, 50, elongated slots are formed (by virtue of the design of the fold lines) between the front panel 14 and the sides 16, 20. The flaps 48, 50 are within the slots. The flaps 44, 46 also include respective end tabs 44*a*, 46*a* that are received by corresponding slots 44*b*, 46*b* in bottom flaps 22*b*, 22*c* to hold the flaps 44, 46 in place in the position shown in FIG. 3.

With reference to FIG. 2, to close the constructed container 10, the side tabs 32 are folded inward, and the top panel 28 of the lid 24 is folded over the interior formed by the sides 14, 16, 18 and 20. It will be appreciated that the container 10 is initially closed for shipment or purchase without the paper substrate 70 affixed thereto, and instead with the mounting arrangement 26 as shown in FIG. 3. This allows for customization by the end user.

In any event, to place the container in the closed position, the front panel 30 of the lid 24 is folded down to cover the front side 14, except that the opening 34 aligns with the photograph mounting arrangement 26. The side tabs 32 are inserted inward of the foldover flaps 44, 46, and the flaps 38 and 40 are inserted into the slots between the front side 14 and the sides 16, 18.

To use the mounting arrangement 26, the lid 24 is opened to provide access to the double-sided tape 52. The user may select and crop any photograph, graphic art element, or other paper substrate 70 with an image 72, such that it generally fits the substrate template indicia 54, but also such that at least the desired portion of the image 72 fits within the image template indicia 56. The opening 34 generally aligns with the image template indicia 56 when the lid 24 is in the closed position. The user then removes the second covers 52*a* of the tape strips 52 and attaches the substrate 70 thereto, such that when the lid 24 is closed, at least a portion of the image 72 is visible through the transparent layer 36. In lieu of a photograph, a drawing, painting or other personalized depiction or design may be used as the substrate 70 and image 72.

The user may then put the lid 24 in the closed position, while the box 12 contains cremated remains or other remains of a human or companion animal. The remains may be placed within the box before or after the substrate 70 is affixed to the mounting arrangement 26.

It will be appreciated that the above-described embodiments are merely illustrative, and that those of ordinary skill in the art may readily devise their own implementations and modifications that incorporate the principles of the present invention and fall within the spirit and scope thereof.

The invention claimed is:

1. An urn configured to receive cremation remains, comprising:

a folded corrugated fiberboard box having a bottom, a front panel, a rear panel, and first and second sides, and a lid configured to extend over a top opening and over the front panel in a closed position, the lid having a first flap inserted between the front panel and the first side in the closed position; and wherein the lid includes a window defined therethrough, and a transparent window cover affixed thereto, and wherein the front panel includes adhesive disposed thereon and adjacent to or aligned with the window when the lid is in the closed position, the adhesive configured to support a paper substrate having at least one image such that, when the lid is in the closed position, at least a portion of the at least one image is visible through the window.

2. The urn of claim 1, wherein the paper substrate having at least one image comprises a photograph.

3. The urn of claim 1, wherein the front panel includes alignment markings defining an alignment position of the paper substrate, wherein the alignment position corresponds to a mounting position of the paper substrate such that when the lid is in the closed position, the portion of the at least one image is visible through the window.

4. The urn of claim 3, wherein the alignment markings include substrate template indicia indicating a size and location for mounting of the substrate, and image template indicia indicate a size and location of visible area of the front panel through the window when the lid is in the closed position.

5. The urn of claim 4, wherein the front panel further includes double-sided tape affixed within the alignment position, and wherein the adhesive is a part of the double-sided tape.

6. The urn of claim 5, wherein the transparent window cover is a transparent sheet mounted to the underside of the lid.

7. The urn of claim 3, wherein the front panel further includes double-sided tape affixed within the alignment position, and wherein the adhesive is a part of the double-sided tape.

8. The urn of claim 4, wherein the transparent window cover is a transparent sheet mounted to the underside of the lid.

9. The urn of claim 4, wherein the corrugated fiberboard box includes a bleached white wall, and further includes decorative design indicia printed on at least portions of the bleached white wall.

10. The urn of claim 1, wherein the front panel further includes double-sided tape affixed to the front panel, and wherein the adhesive is a part of the double-sided tape.

11. The urn of claim 10, wherein the transparent window cover is a transparent sheet mounted to the underside of the lid.

12. A blank for assembly into an urn, comprising:

a corrugated fiberboard blank scored and cut to be foldable into a box having a bottom, a front panel, a rear panel, and first and second sides, and a lid configured to extend over a top opening and over the front panel in a closed position, the lid having a first flap inserted between the front panel and the first side in the closed position; and wherein the lid includes a window defined therethrough, and a transparent window cover affixed thereto, and wherein the front panel includes adhesive disposed thereon and adjacent to or aligned with the window when the lid is in the closed position, the adhesive configured to support a paper substrate having at least one image such that, when the lid is in the closed position, at least a portion of the at least one image is visible through the window.

13. The blank of claim 12, wherein the front panel includes alignment markings defining an alignment position of the paper substrate, wherein the alignment position corresponds to a mounting position of the paper substrate such that when the lid is in the closed position, the portion of the at least one image is visible through the window.

14. The blank of claim 13, wherein the alignment markings include substrate template indicia indicating a size and location for mounting of the substrate, and image template indicia indicate a size and location of visible area of the front panel through the window when the lid is in the closed position.

15. The blank of claim 14, wherein the front panel further includes double-sided tape affixed within the alignment position, and wherein the adhesive is a part of the double-sided tape.

16. The blank of claim 15, wherein the transparent window cover is a transparent sheet mounted to the underside of the lid.

17. The blank of claim 14, wherein the corrugated fiberboard blank includes a bleached white wall, and further includes decorative design indicia printed on at least portions of the bleached white wall.

* * * * *